Dec. 23, 1941.  E. R. MILLER  2,267,161
CRADLE TYPE REEL WITH ROTARY PLATES
Filed Nov. 2, 1938   3 Sheets-Sheet 2

Dec. 23, 1941.　　　E. R. MILLER　　　2,267,161
CRADLE TYPE REEL WITH ROTARY PLATES
Filed Nov. 2, 1938　　　3 Sheets-Sheet 3

Inventor:
Edgar R. Miller

Patented Dec. 23, 1941

2,267,161

UNITED STATES PATENT OFFICE 2,267,161

CRADLE TYPE REEL WITH ROTARY PLATES

Edgar R. Miller, Chicago, Ill., assignor to F. J. Littell Machine Company, Chicago, Ill., a corporation of Illinois Application November 2, 1938, Serial No. 238,401

7 Claims. (Cl. 242—78)

The invention relates to reels for supporting coil stock and has reference more particularly to a motor driven cradle type reel which will incorporate automatic means governing the operation of the motor in response to the size of the outer loop of material unwinding from the coil of stock.

Another object of the invention resides in the provision of a cradle type reel in which the coil stock will be supported and also driven by peripheral contacting rolls having operative connection with an electric motor through a variable speed device so that the coil can be driven at about the correct speed with seldom starting and stopping of the motor.

Another object is to provide a cradle type reel having rotary discs for rotating with the coil stock to protect the edges of the material against damage such as curling.

A further object is to provide laterally adjustable plate members for journalling the rotary discs above mentioned and which members will be operatively connected so that they will move in unison for centering the coil of stock.

Another object is to provide a reel for supporting coils of different width and which will guide said coils without damaging the edges of the stock.

With these and various other objects in view the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 4 is a wiring diagram illustrating the electrical connections between the motor and the switch means.

Figure 1:
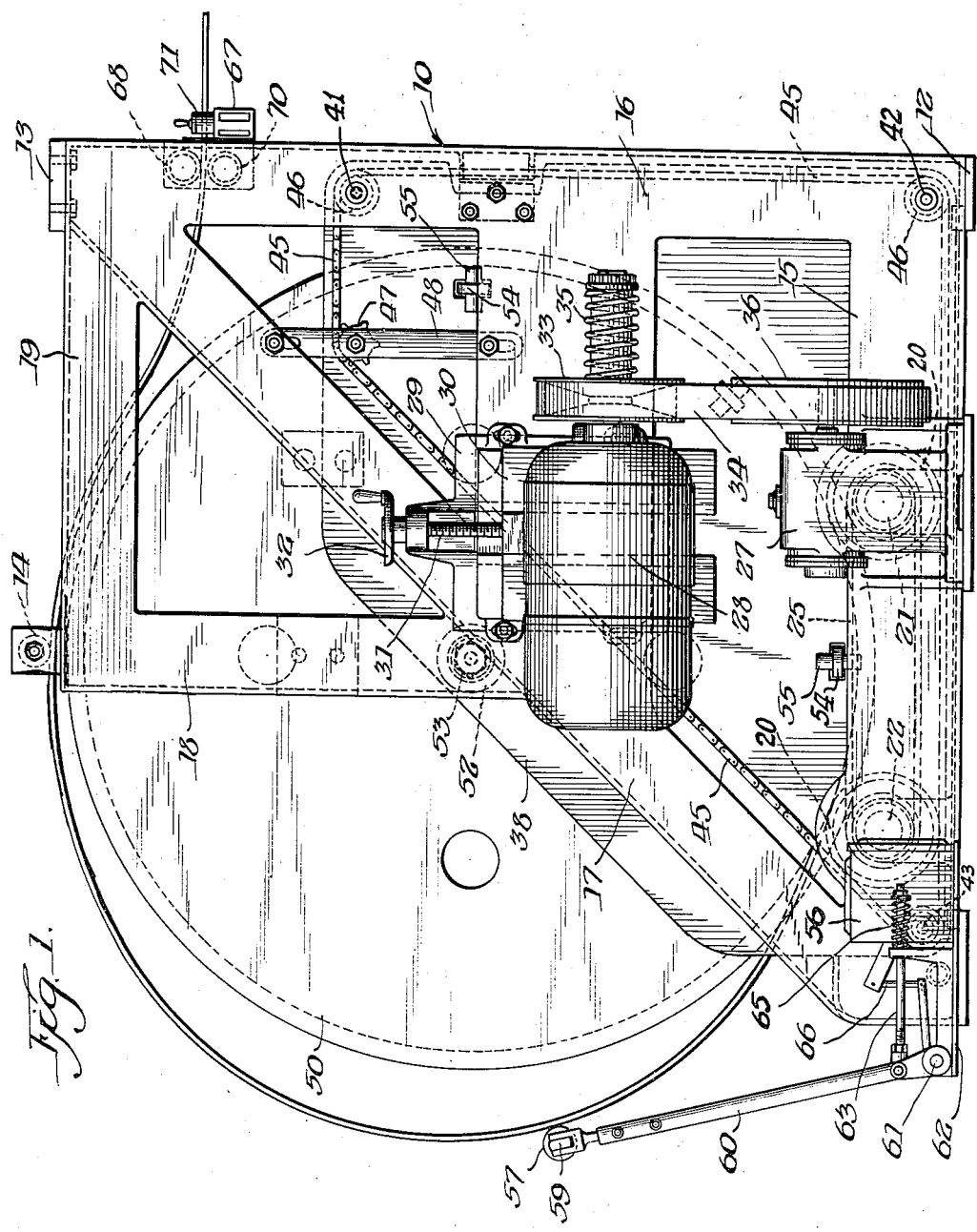
Figure 1 is a side elevational view of a cradle type reel embodying the features of the present invention.

Referring to the drawings, the present reel consists of a built-up frame including side members 10 and 11 suitably connected in spaced relation by bottom members 12 and by the top member 13 and transverse guiding roller 14. Each side member, as shown in Figure 1, consists of a base portion 15 having formed integral therewith at the front end an upright 16 and at the rear end a diagonal part 17. Extending upwardly from about the center of the diagonal part is an upright 18 which is connected at its upper end by the horizontal portion 19 to the main section of the frame.

When the coil of stock material is positioned between the side frames of the present reel the same is supported and also rotated by peripheral contacting rolls 20 suitably fixed to the transverse shafts 21 and 22 in proper adjusted position transversely of the shafts. The rolls may have a covering of Duprene rubber to provide the necessary friction for rotating the coil of stock material, or said rolls may be formed of wood or other material. The shafts are suitably mounted in journal portions 23 provided therefor on the inside surface of each frame member 10 and 11. More particularly, the portions 23 extend inwardly from the base portion 15 of the frame. Both shafts extend beyond the frame member 11 and are each provided with a sprocket 24 adapted to receive the endless chain 25 for operatively connecting the shafts so that they rotate in unison and at the same speed.

Figure 2:
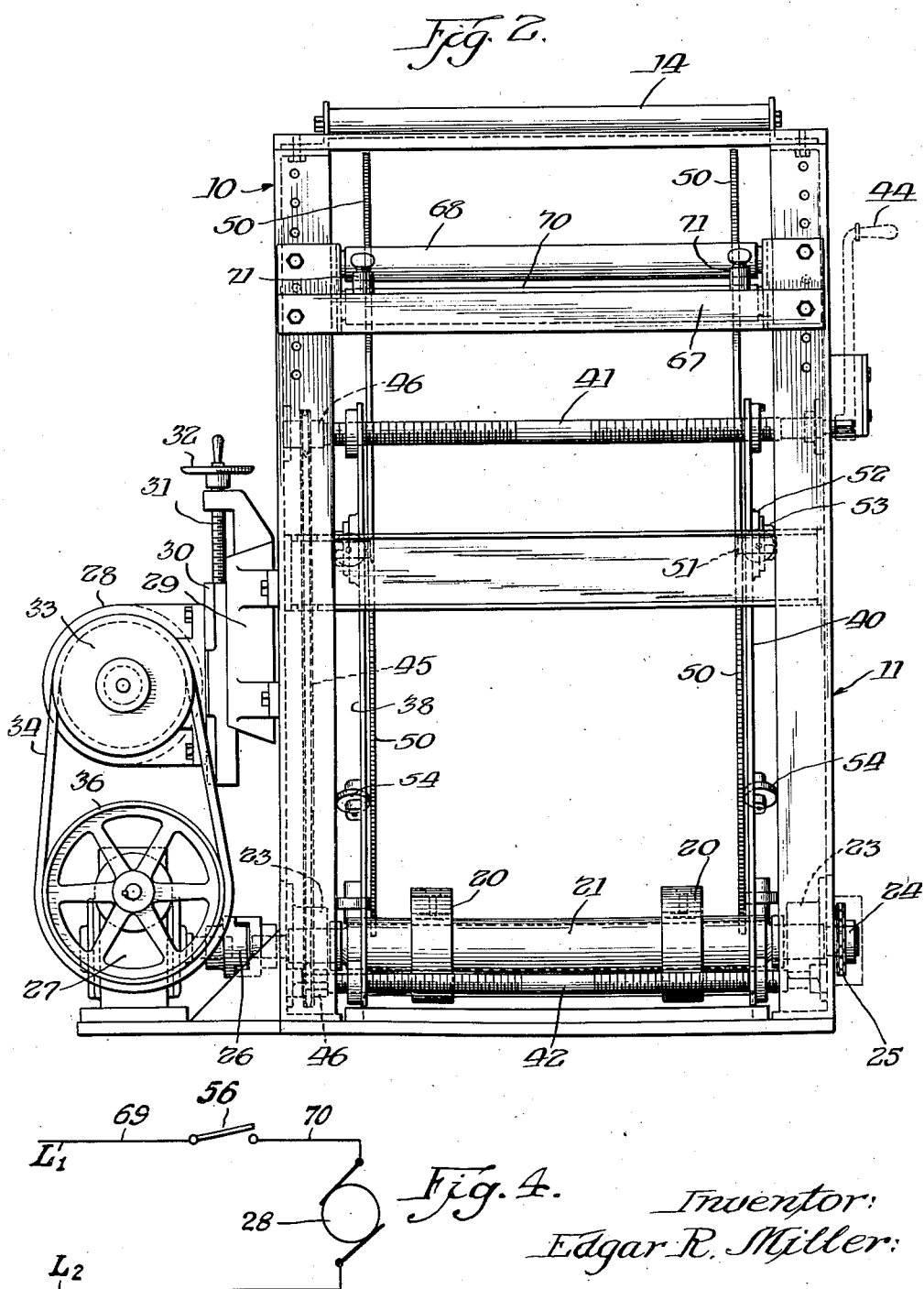
Figure 2 is a front elevational view of the reel shown in Figure 1.
Figure 3:
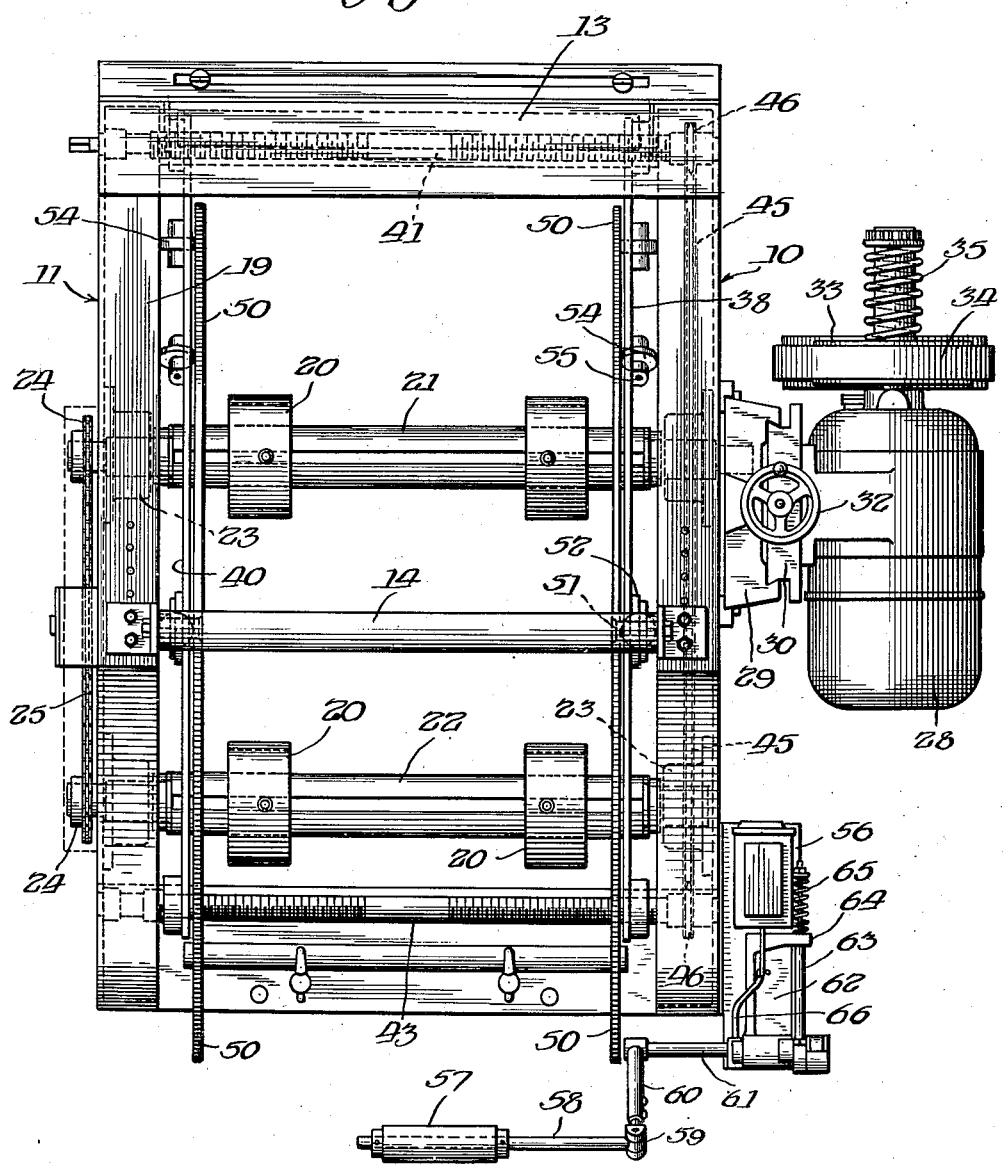
Figure 3 is a top plan view of the cradle type reel of the invention.

Shaft 21 extends beyond side member 10 and is operatively connected by coupling 26, Figure 2, to a gear housing 27, which is in turn driven by an electric motor 28. The frame member 10 is provided with the fixed support 29 which slidably receives the guide 30 having the electric motor secured thereto. The position of the motor vertically of the support 29 may be varied by means of the elongated screw 31 which has fixed to its upper end the adjusting wheel 32. The shaft of the motor is provided with a speed variating pulley designated by numeral 33, one cone member of which is yieldingly biased into contact with the endless belt 34 by the coil spring 35. Said belt passes around the pulley 36 which connects with the coupling 26 through gear housing 27 and accordingly the shafts 21 and 22 are driven by the motor 28. When it is desired to vary the speed of rotation of said shafts and thus the peripheral contacting rolls 20 it is only necessary to vary the position of the electric driving motor 28. This is done by rotation of the adjusting wheel 32 and automatically with a change in elevation of the motor the speed variating pulley 33 will drive pulley 36 at a faster or at a slower speed, depending on the direction of movement of said motor.

For centering the coil of stock within the present reel the invention provides adjustable plate members 38 and 40 which are provided with a sloping rear surface conforming to the diagonal part 17 of the frame members. The plates 38 and 40 are associated with the frame members 10 and 11, respectively, and are supported by said frame members and also operatively connected by elongated screws 41, 42 and 43. Each screw is provided with right and left hand threads so that upon rotation of said screw the plate members will be caused to move in unison and in a direction either toward each other or outwardly away from each other. Screw 41 extends beyond frame member 11 and receives the actuating handle 44 which when grasped by the operator and rotated will cause corresponding rotation of said screw. This movement of screw 41 is imparted to the screws 42 and 43 by the endless chain 45 operatively connecting with said screws. Said chain passes over a sprocket wheel 46 fixed to each screw and also has contact with the idling sprocket 47 carried by the vertical frame piece 48, Figure 1.

Each plate member journals a rotating disc 50 which is adapted to engage the edges of the coil of stock material. The stud shaft 51, projecting outwardly from the center of each disc, is journalled by its respective plate member by means of the boss 52 formed on the outside surface thereof. The outer end of each stud shaft is suitably threaded for receiving the nut 53 by which the discs are held to their respective plate member, which, however, permit rotation of the discs. In order that the pressure applied by the rotary discs will be substantially uniform throughout its area each plate member carries a plurality of backing up rollers identified by numeral 54. Openings are provided in the plate members so that the said rollers extend through and project a short distance beyond the inside surface so as to have contact with the rotary discs and therefore space said discs from said surface. Stud shafts 55 journal the backing up rollers in each instance. Said rollers in effect space the rotary discs from the plate members and in providing rolling contact facilitate rotation of the discs.

The motor 28 is controlled by the switch 56 and which control is responsive to the size of the outer loop of stock material unwinding from the coil. As shown in Figure 1, said outer loop will contact the roller 57, carried by the horizontal shaft 58, pivotally secured at 59 to the arm 60. Said arm is fixed at its lower end to the rock shaft 61, suitably journalled in the base member 62 of the electric switch. The arm 60 is yieldingly biased in a direction inwardly to maintain roller 57 in contact with the outer loop of stock by the rod 63 passing through abutment 64 and which carries on its projecting end the coil spring 65. The linkage 66 connects the arm 60 with the electric switch 56 so that said switch is actuated in response to movement of said arm. The electric motor 28 is electrically connected with a source of curent L1 and L2 as shown in Figure 4 by conductors 68, 69 and 70. The switch 56 is interposed in conductors 69 and 70 and the current supply to the motor is thereby controlled by actuation of said switch.

For inserting a coil of stock within the present reel the plate members 38 and 40 are first separated by rotation of the screws 41, 42 and 43. The coil is then rolled onto the reel from the rear, which requires that the shaft 58 carrying the roller 57 be moved out of the way into its up position so as to form a continuation of the arm 60, in which position of the parts there is no obstruction to the placing of the heavy coil of stock on the reel. The screws are then rotated by handle 44 in a direction to cause movement of the plate members in a direction inwardly until both sides of the coil are in contact with a rotary disc 50. The plate members will move in unison to an equal extent and accordingly the coil is automatically centered on the reel. The said coil will now be supported at four points by the four contacting rolls 20 and the motor may be operated for rotating the coil to bring the leading edge of the material to the transverse guiding roller 14, which is then directed under said bar and toward the front of the reel. For properly positioning the material fed by the reel the same is provided with a cross piece 67 which may be adjustably secured to the upright portion 16 of the frame members 10 and 11. This member is made vertically adjustable so that the feeding of the material may be varied in height to suit different machines with which the reel may be associated. Rollers 68 and 70 are suitably journalled by said cross piece in proper spaced relation and the stock material passes through said rollers, which allows free movement of the same in a feeding direction while determining the position of said feed vertically of the reel. The side rollers 71 engage with the side edges of the material and limit movement of the same laterally.

The outer loop of the coil supported by the reel is confined by the transverse bar 14 so that the same projects rearwardly of the reel where contact with the roller 57 results. Said roller and the arm 60 comprise the automatic control for the electric motor 28 which will operate intermittently to feed the proper quantity of material. If the feed is in excess of that required the outer loop 75 will increase in size to the extent where the swich is actuated to stop operation of the electric motor. When this outer loop has been substantially reduced in size the arm 60 will have moved inwardly where the motor will again operate.

The present reel will support coils of different widths since the plate members 38 and 40 carrying the rotary discs 50 are laterally adjustable for this purpose. The contacting rolls 20 can also be varied in position on their respective shafts in order to accommodate a wide coil of stock or a relatively narrow coil, for which latter use the rolls are moved inwardly to each other. Irrespective of the width of the particular coil of stock supported by the present reel the same is guided by the rotary discs and automatically centered on the reel. The rotary discs also in contacting the side edges of the coil protect the edges against damage such as curling.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A reel including in combination, a plurality of spaced rollers mounted for rotation and adapted to support a coil of stock, a base journalling said spaced rollers and having upright frame members, power means for driving said spaced rollers, a vertically extending plate member positioned on the inside of each frame member, means supported by said frame members and operatively connecting with the plate members whereby said plate members are adjustable laterally of the reel, and a disc mounted for rotation by each plate member and adapted to engage its respective side of said coil for protecting the same against damage.

2. A reel including in combination, a plurality of spaced rollers mounted for rotation and adapted to support a coil of stock, a base journalling said spaced rollers and having upright frame members, power means for driving said spaced rollers, a pair of vertically extending plate members positioned between said frame members and normally spaced from each other, means mounted in said frame members for supporting and operatively connecting said plate members whereby the plate members are adjustable laterally of the reel, and a rotary disc positioned adjacent the inside surface of each plate member and journalled thereby, said discs being adapted to engage the respective sides of said coil for protecting the same against damage.

3. A reel including in combination, a plurality of spaced rollers mounted for rotation and adapted to support a coil of stock, a base journalling said spaced rollers and having upright frame members, power means for driving said spaced rollers, a pair of vertically extending plate members positioned between said frame members and normally spaced from each other, a rotary disc journalled in each plate member and positioned adjacent the inside surface thereof, said discs being adapted to engage the respective sides of said coil for protecting the same against damage, and means having manual actuation for supporting said plate members in a manner whereby they may be adjusted laterally of the reel.

4. In a cradle type reel, in combination, a frame including a base having upright frame members, a pair of shafts journalled in said base in spaced relation, supporting means fixed to each shaft and adapted to contact the periphery of a coil or the like to thereby support the same for rotary movement, an electric motor for driving said shafts, speed variating means interposed between said motor and shafts whereby their rotary speed may be varied to suit conditions, a pair of vertically extending plate members positioned between said frame members and normally spaced from each other, a rotatable disc journalled in each plate member and located adjacent the inside surface thereof, said rotatable discs being adapted to engage the respective sides of said coil for guiding the same and protecting the edges of the coil against damage, and means for simultaneously adjusting the position of the plate members laterally of the reel.

5. In a cradle type reel, in combination, a frame including a base having upright frame members, a pair of shafts journalled in said base in spaced relation, supporting means fixed to each shaft and adapted to contact the periphery of a coil or the like to thereby support the same for rotary movement, an electric motor for driving said shafts, speed variating means interposed between said motor and shafts whereby their rotary speed may be varied to suit conditions, a pair of vertically extending plate members positioned between said frame members and normally spaced from each other, a rotatable disc journalled in each plate member and located adjacent the inside surface thereof, said rotatable discs being adapted to engage the respective sides of said coil for guiding the same and protecting the edges of the coil against damage, threaded means journalled in said frame members and operatively connecting the plate members, said threaded means when rotated simultaneously adjusting the position of said plate members laterally of the reel for accommodating coils of various widths.

6. In a cradle type reel, in combination, a frame including a base having upright frame members, a pair of shafts journalled in said base in spaced relation, supporting means fixed to each shaft and adapted to contact the periphery of a coil or the like to thereby support the same for rotary movement, an electric motor for driving said shafts, speed variating means interposed between said motor and shafts whereby their rotary speed may be varied to suit conditions, a pair of vertically extending plate members positioned between said frame members and normally spaced from each other, a rotatable disc journalled in each plate member and located adjacent the inside surface thereof, said rotatable discs being adapted to engage the respective sides of said coil for protecting the same against damage, and manually actuated means for causing movement of said plate members simultaneously and in opposite directions laterally of the reel for centering the coil or the like supported thereby.

7. In a cradle type reel, in combination, a frame including a base having upright frame members, a pair of shafts journalled in said base in spaced relation, supporting means fixed to each shaft and adapted to contact the periphery of a coil of stock to thereby support the same for rotary movement, an electric motor for driving said shafts, speed variating means interposed between said motor and shafts whereby their rotary speed may be varied to suit conditions, a pair of vertically extending plate members positioned between said frame members and normally spaced from each other, a rotatable disc journalled in each plate member and located adjacent the inside surface thereof, said rotatable discs being adapted to engage the respective sides of said coil for protecting the same against damage, manually actuated means for causing movement of said plate members simultaneously and in opposite directions laterally of the reel for centering the coil of stock supported thereby, switch means for said electric motor, and an oscillating arm connecting with said switch means and having movement in response to the size of the outermost loop of the coil.

EDGAR R. MILLER.